US012183221B2

(12) United States Patent
Oh

(10) Patent No.: US 12,183,221 B2
(45) Date of Patent: Dec. 31, 2024

(54) ADHESIVE LABEL FOR PET BOTTLES AND METHOD OF FORMING THE LABEL

(71) Applicant: Dongil Chemical Co., Ltd., Cheonan-si (KR)

(72) Inventor: Won Seok Oh, Yongin-si (KR)

(73) Assignee: Dongil Chemical Co., Ltd., Cheonan-si (KR)

( * ) Notice: Subject to any disclaimer, the term of this patent is extended or adjusted under 35 U.S.C. 154(b) by 0 days.

(21) Appl. No.: 18/328,383

(22) Filed: Jun. 2, 2023

(65) Prior Publication Data

US 2024/0312372 A1 Sep. 19, 2024

(30) Foreign Application Priority Data

Mar. 16, 2023 (KR) ........................ 10-2023-0034433

(51) Int. Cl.
*G09F 3/02* (2006.01)
*G09F 3/10* (2006.01)

(52) U.S. Cl.
CPC .................. *G09F 3/02* (2013.01); *G09F 3/10* (2013.01); *G09F 2003/0241* (2013.01)

(58) Field of Classification Search
CPC ....... G09F 3/02; G09F 3/10; G09F 2003/0241
USPC ...... 283/67, 70, 72, 74, 79, 81, 94, 98, 100, 283/101, 103, 104, 105
See application file for complete search history.

(56) References Cited

U.S. PATENT DOCUMENTS

| | | | | |
|---|---|---|---|---|
| 2014/0210198 A1* | 7/2014 | Key | ........................... | C09J 7/22<br>283/81 |
| 2019/0019435 A1* | 1/2019 | Neubauer | ............... | G09F 3/005 |

FOREIGN PATENT DOCUMENTS

| | | | |
|---|---|---|---|
| JP | 2636163 B2 | 7/1997 | |
| JP | 2009048147 A | 3/2009 | |
| KR | 102225814 B1 | 3/2021 | |
| KR | 20210138345 A | 11/2021 | |

OTHER PUBLICATIONS

Extended European Search Report for EP application No. 23175078.7 issued by the European Patent Office on Nov. 24, 2023.

* cited by examiner

*Primary Examiner* — Justin V Lewis
(74) *Attorney, Agent, or Firm* — Kim IP Law Group LLC

(57) ABSTRACT

The present invention relates to a label made of a synthetic resin film in a roll-type, and disclosed is a label 20 coated with a pressure sensitive adhesive, wherein an adhesive portion 21 of a certain width coated with the pressure sensitive adhesive is formed at the intervals of one label which is to be attached to a PET bottle, and wherein the adhesive portion 21 consists of a front end adhesive portion 21*a* which is attached to the PET bottle and a rear end adhesive portion 21*b* which is attached to overlap on the front end adhesive portion 21*a*, and cutting is made at a cutting line 22 between the front end adhesive portion and the rear end adhesive portion 21*b*. As the synthetic resin film, a general non-shrinkable film as well as a heat-shrinkable film may be used.

5 Claims, 3 Drawing Sheets

PRIOR ART

ADHESIVE LABEL FOR PET BOTTLES AND METHOD OF FORMING THE LABEL

TECHNICAL FIELD

The present invention relates to labels attached to various PET bottles such as bottled water containers. More specifically, the present invention relates to a label attached to a PET bottle which can be easily removed, with no adhesive residue remaining on the surface of the PET bottle after label removal. The present invention also includes a method of attaching the label.

BACKGROUND

PET bottles made of polyester (PET) as a raw material are used as various containers for bottled water, beverages, alcoholic beverages, foods, medicines, and the like. Since PET bottles are mostly disposably used and discharged, collecting and recycling used bottles is very important for environmental protection as well as resource saving.

The recycling rate of PET bottles is known to be about 60% worldwide, and 40% of PET resources are incinerated or disposed of in landfills. Discarded PET bottles are pointed out as a major cause of environmental pollution. Particularly, marine pollution caused by PET bottles is at a serious level, and since they are not degraded for a long time, they are adversely affecting the ecosystem. It is known that most of the residue entering the ocean is mixed PET sludge that is not sorted in the PET bottle recycling process. Increasing the recycling rate of PET bottles is a way to reduce environmental pollution.

Although many efforts have been made to increase the recycling rate of PET bottles, technologies that can bring significant effects has not been developed due to various problems. One of the reasons why the recycling rate of PET bottles cannot be increased is related to the separation technology of adhesive labels attached to PET bottles.

In a PET bottle, the body is made of polyester (PET), the cap (stopper) is made of polyethylene (PE), and the label is made of polystyrene (PS), PET, polypropylene (PP), polyvinyl chloride (PVC) or a mixed resin of two or more thereof. As such, since the label is made of a different resin than the PET bottle and printed in various colors regardless of the material, removing the label in advance is the best way to recycle the PET bottle. If the label is removed from the PET bottle in advance and discharged separately, the recycling rate of the PET bottle can rise to 90% or more, and the quality of the recycled PET can also be improved.

Labels attached to PET containers are largely classified into three types: sticker labels, adhesive labels (adhesive strip labels), and heat shrinkable labels.

The sticker label is a provided in the form of a sticker attached to a rectangular container such as a fruit container or a lunch box. Since the sticker label is attached to the container using an adhesive, it is not easy to remove it. And since the adhesive remains on the container surface even after the sticker label is removed, the quality of the recycled PET is adversely affected. A technique for solving the problem of sticker labels is disclosed in Korean Patent Application No. 2021-51594 (Publication No. 2022-145015).

Adhesive strip labels are very widely used, accounting for almost half of all labels. The adhesive strip label is a label in which a printed label film is attached to a PET bottle of a rectangular or circular cross section, such as a bottled water container, in the form of a strip (band) using an adhesive. An adhesive is applied to the surface of a PET bottle, and both ends of the label are adhered thereon to attach a strip-shaped label. Since the adhesive strip label uses adhesives like the sticker label, the adhesive remains on the surface of the container even after the label is removed. Since the conventional adhesive strip label uses a slow dry adhesive, the adhesive remains in the PET container, which causes a serious problem. To solve this problem, the present inventors have developed a technology using a fast dry adhesive (or pressure sensitive adhesive) instead of a slow dry adhesive.

Korean Patent Application No. 2021-37843 (Publication No. 2022-132820) discloses a PET bottle label consisting of a peelable adhesive tape with a tag coated with a pressure sensitive adhesive to be attached to a PET bottle, and a label with a slow dry adhesive applied on it to be attached to the peelable adhesive tape.

Although slow dry adhesives remain in PET bottles causing a problem in PET recycling process, the reason why slow dry adhesives have been used so far is that the labeling process proceeds at a very high speed, so pressure sensitive adhesives cannot be used in the process and slow dry adhesives should be used.

Therefore, the present inventors came to develop the present invention to solve the problem of remaining adhesive to overcome the shortcomings of the conventional method by preparing a label coated with a pressure sensitive adhesive and attaching the label to the PET bottle.

The present invention is an adhesive strip label because the label to which the adhesive is pre-applied is attached to the PET bottle. Adhesive strip labels use a general non-shrinkable film as a label film, not shrinkable film. However, in the present invention, an adhesive strip label may be formed using a shrinkable film also.

A heat-shrinkable label using a shrinkable film, unlike a sticker label or an adhesive strip label, is a label made of a shrinkable film. A heat shrinkable label is a label that is made by a process comprised of: producing a cylindrical (tubular) print film using a shrinkable film; inserting a PET bottle filled with the contents into the cylindrical print film; and shrinking the print film in a heating chamber to make it adhere to the PET bottle. A heat shrinkable label is a label widely applied in the field of PET bottles, and a shrinkable film having various characteristics has been developed and used. The present inventors also developed a heat-shrinkable film for labels and patented it as Korean Patent No. 1156607.

Heat-shrinkable labels do not cause problems due to adhesives because the cylindrical printed film is adhered to the PET bottle by heat-shrinking without using adhesives. However, since the label adheres closely to the PET bottle, it is not easy to remove it. Therefore, after cutting the PET bottle with the heat-shrinkable label into small pieces, the label is removed by a water separation method using the difference in specific gravities between the label and the PET bottle. It is a method of cutting a PET bottle into small pieces and separating the label and the PET bottle by using the difference in specific gravities, which is a treatment process incurring a lot of cost and time.

However, since the adhesive strip label of the present invention formed using the shrinkable film can be easily removed, there is no need of water separation unlike conventional heat-shrinkable labels.

SUMMARY OF THE INVENTION

An objective of the present invention is to provide a new label that solves the problem of adhesive residue by manufacturing a label coated with a pressure sensitive adhesive and attaching the label to a PET bottle.

Another objective of the present invention is to provide a label coated with a pressure sensitive adhesive using a non-shrinkable film or a shrinkable film as a label film.

Still another objective of the present invention is to provide a novel PET bottle label that can dramatically increase the recycling rate of the PET bottle, improve the quality of recycled PET and significantly reduce recycling costs because it is easy to remove the adhesive strip label attached to the PET bottle without remaining adhesive residues after label removal.

The above and other objectives of the present invention can all be achieved by the present invention described in detail below.

The label 20 coated with the pressure sensitive adhesive of the present invention is a label made of a synthetic resin film as a roll-type, and has an adhesive portion 21 of a certain width to which the pressure sensitive adhesive is applied at intervals of one label attached to a PET bottle, and the adhesive portion 21 consists of a front end adhesive portion 21*a* which is attached to the PET bottle, and a rear end adhesive portion 21*b* attached to overlap on the front end adhesive portion 21*a*, wherein cutting is made at the cutting line 22 between the front end adhesive portion 21*a* and the rear end adhesive portion 21*b*.

A non-adhesive portion 21*c* to which a pressure sensitive adhesive is not applied may be formed at the upper portion of the rear end adhesive portion 21*b* to facilitate label removal. The non-adhesive portion 21*c* serves as a tag for removing the label.

A general non-shrinkable film as well as a heat-shrinkable film may be used for the synthetic resin film of the present invention.

In the case of using a shrinkable film as the label film, a process of heat-shrinking the attached label by heating in a heating chamber after attaching the label to the PET bottle is further included. The process of heat-shrinking the label consists of shrinking it for about 1 second in a heating chamber at 70 to 80° C.

Labels attached to PET bottles without curves do not require a separate heat-shrinking process because adhesive strip labels are formed with general non-shrinkable labels. However, a non-shrinkable label cannot be used on a PET bottle having curves or irregularities because there are parts where the non-shrinkable label is not adhered to the PET bottle when the label is attached. Therefore, a shrinkable label is attached to a PET bottle having curves or irregularities and then heated in a heating chamber so that the label shrinks and adheres to the surface of the container.

Hereinafter, specific details of the present invention will be described with reference to the accompanying drawings.

The present invention has the effect of providing a novel label that addresses the problem of adhesive residue by manufacturing a label coated with a pressure sensitive adhesive and attaching the label to a PET bottle, thereby making the removal easier the adhesive strip label attached to the PET bottle. In addition, since the adhesive does not remain on the PET bottle after label removal, the recycling rate of the PET bottle can be dramatically increased, the quality of the recycled PET improved, and the recycling cost significantly reduced.

DETAILED DESCRIPTION OF THE EMBODIMENTS

The present invention relates to labels attached to various PET bottles such as bottled water containers, and relates to labels which are attached to PET bottles and can be easily removed without leaving adhesive residues on the surface of PET bottles after label removal.

Figure 1:
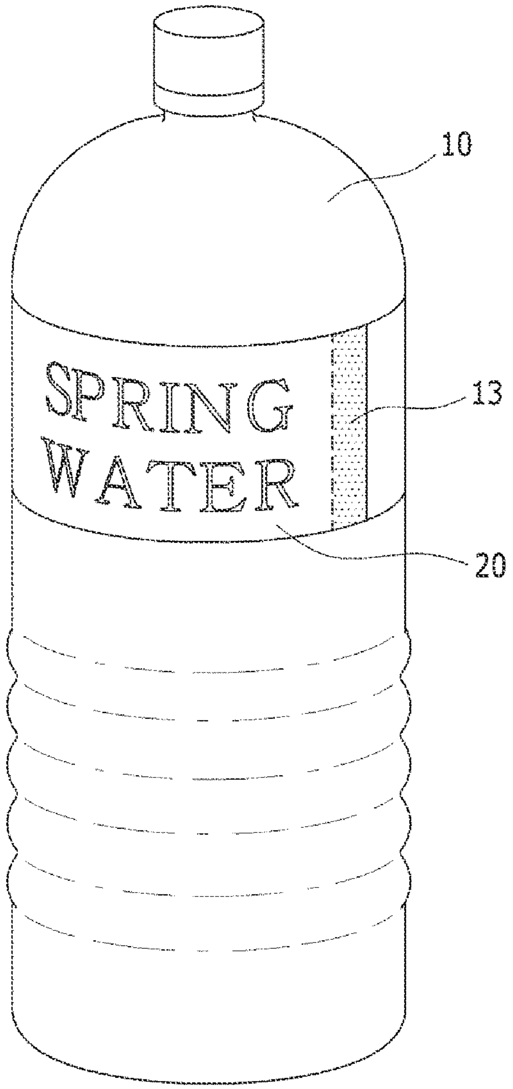
FIG. 1 is a schematic perspective view illustrating a conventional PET bottle 10, as a prior art, to which a label 20 is attached using a slow dry adhesive.

FIG. 1 is a schematic perspective view illustrating a conventional PET bottle 10, as a prior art, to which a label 20 is attached using a slow dry adhesive.

In the conventional adhesive strip label shown in FIG. 1, a printed label film is attached to a PET bottle of a rectangular or circular cross section, such as a bottled water container, in the form of a strip (band) using an adhesive. An adhesive is applied to the surface of a PET bottle, and both ends of the label are adhered thereon to attach a strip-shaped label. Since the conventional adhesive label uses a slow dry adhesive, the adhesive residue remains in the PET container even after the label is removed.

The present invention provides a solution to the problem of adhesive residue by making a label coated with a pressure sensitive adhesive and attaching the label to the PET bottle, departing from the conventional method of applying a slow dry adhesive to a PET bottle and attaching a label thereon.

Figure 2:
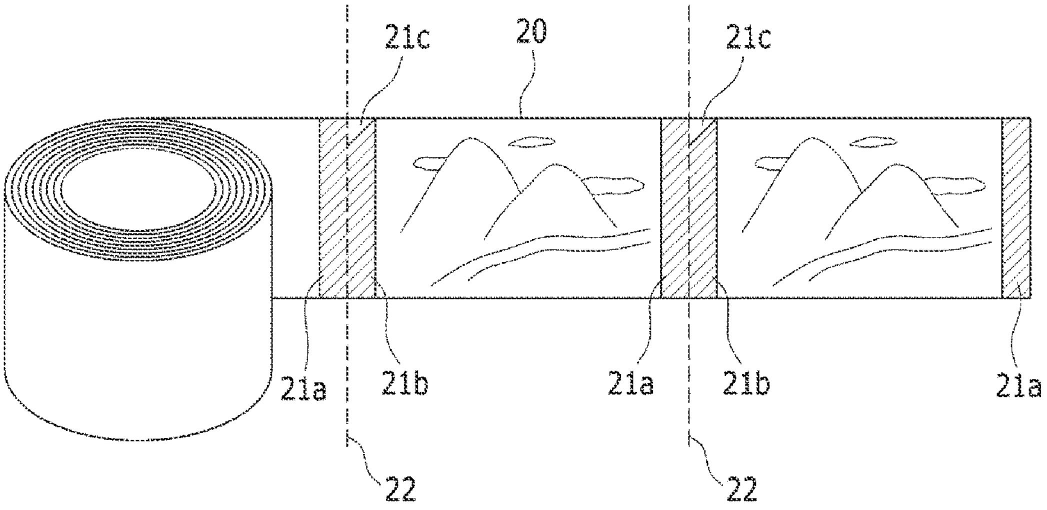
FIG. 2 is a schematic perspective view illustrating a roll-type label 20 according to the present invention in which an adhesive portion 21 having a certain width is formed by applying a pressure sensitive adhesive at the intervals of one label which is to be attached to a PET bottle.

FIG. 2 is a perspective view schematically illustrating a roll-type label 20 according to the present invention in which an adhesive portion 21 having a certain width is formed by applying a pressure sensitive adhesive at the intervals of one label which is to be attached to a PET bottle.

The label 20 coated with the pressure sensitive adhesive of the present invention is a label made of a synthetic resin film in a roll form, and an adhesive portion 21 of a certain width coated with a pressure sensitive adhesive is formed at the intervals of one label which is to be attached to a PET bottle, and the adhesive portion 21 consists of a front end adhesive portion 21*a* attached to the PET bottle and a rear end adhesive portion 21*b* attached to overlap on the front end adhesive portion 21*a*, and cutting is made at the cutting line between the front end adhesive portion 21*a* and the rear end adhesive portion 21*b*. Forming the adhesive portion 21 by applying the pressure sensitive adhesive at the intervals of one label when manufacturing the roll-type label 20 can be easily understood by those skilled in the art to which the present invention pertains.

The task of labeling PET bottles by supplying rolls of labels is a very high-speed process. As the label 20 is supplied at a constant speed, the front end adhesive portion 21*a* is attached to the PET bottle, and the PET bottle rotates once to attach the rear end adhesive portion 21*b* overlapping the front end adhesive portion 21*a*. At the same time, the label 20 is cut along the cutting line 22 between the front end adhesive portion 21*a* and the rear end adhesive portion 21*b*. This labeling operation is performed continuously at a high speed of about 100 to 200 labels per minute in an automated facility.

A non-adhesive portion 21*c* on which a pressure sensitive adhesive is not applied may be formed at the upper part of the rear end adhesive portion 21*b* to facilitate label removal. The non-adhesive portion 21*c* serves as a tag for removing the label.

Figure 3:
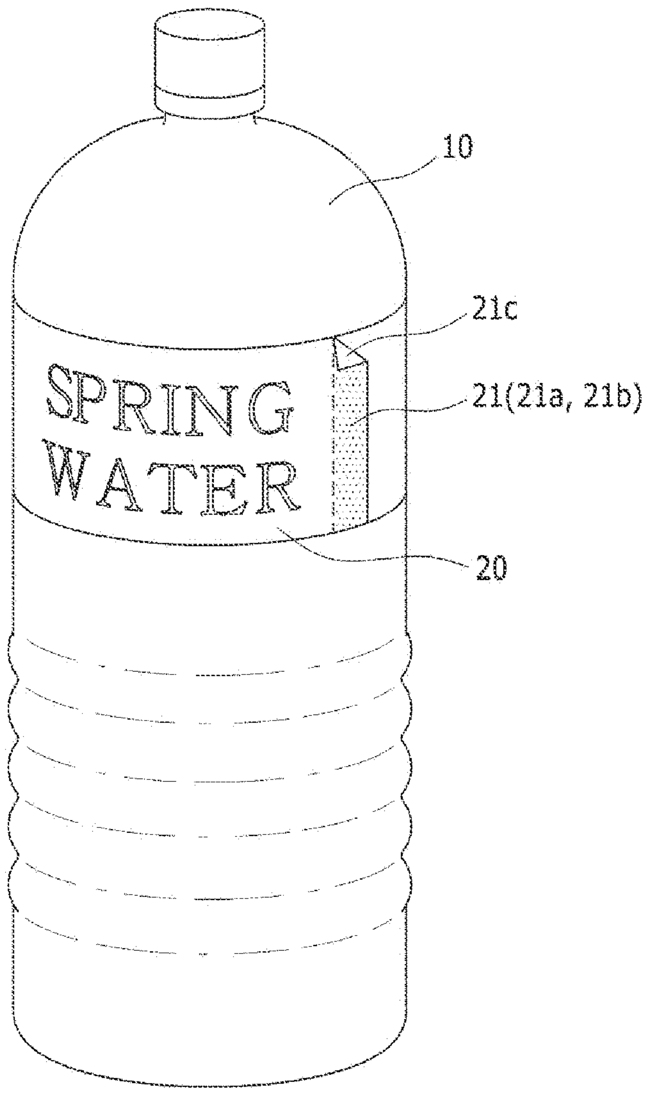
FIG. 3 is a schematic perspective view illustrating a PET bottle 10 with an attached label 20 on which a pressure sensitive adhesive according to the present invention is applied.

FIG. 3 is a schematic perspective view illustrating a PET bottle 10 with a label 20 attached wherein a pressure sensitive adhesive according to the present invention is applied to the label.

As shown in FIG. 3, a non-adhesive portion 21*c* on which no adhesive is applied is formed on the upper part of the rear end adhesive portion 21*b*, and the label 20 can be easily removed by pulling this portion. Since the label 20 of the present invention uses a pressure sensitive adhesive, the adhesive residue does not remain on the surface of the PET bottle even after the label is removed.

The label 20 is a synthetic resin film, and a general non-shrinkable film as well as a heat-shrinkable film can be used.

In the case of using a shrinkable film as the label film, a step of heat-shrinking the attached label by heating in a heating chamber after attaching the label to the PET bottle is further included. The process of heat-shrinking the label consists of shrinking it for about 1 second in a heating chamber at 70 to 80° C.

Labels attached to PET bottles without curves do not require a separate heat shrinking process because they form adhesive strip labels with a general non-shrinkable labels. However, the non-shrinkable label cannot be used on a PET bottle having curves or irregularities because there could be portions where the non-shrinkable label is not adhered on the surface of the bottle when the label is attached to the PET bottle. Therefore, a shrinkable label is attached to a PET bottle having curves or irregularities and then heated in a heating chamber so that the label shrinks and adheres to the surface of the container.

Conventional heat-shrinkable labels are heat-shrinked for about 2 seconds in a heating chamber at 80-90° C. As the heating temperature increases, the contents of the PET bottle may deteriorate or the PET container may be deformed. In the present invention, the heating temperature can be lowered to 70 to 80° C. and the heating time can be shortened to about 1 second because the strip label is first attached by the adhesive and then thermally shrunk.

Also, since in a conventional heat-shrinkable label, a cylindrical (tubular) print film is made and a PET bottle is inserted into the cylindrical print film, the cylindrical film should be made about 20% larger than the actual label. However, in the present invention, since the adhesive label is primarily formed by an adhesive, it is attached to a degree almost similar to the actual size of the label. Therefore, the present invention can reduce raw material costs by about 20% compared to conventional heat-shrinkable labels.

The present invention relates to a label of a novel concept in which a pressure sensitive adhesive is applied to the label 20 to form an adhesive strip label, and the label can be easily removed without leaving adhesive residue on the PET bottle after label removal. As a result, the recycling rate of the PET bottle can be dramatically increased, the quality of recycled PET bottle improved, recycling costs significantly reduced, and cost of raw material saved compared to conventional heat-shrinkable labels.

The label of the present invention can be applied to PET bottles used as various containers such as bottled water, beverages, foods, and medicines.

Simple modifications or changes of the present invention can be easily performed by those skilled in the art, and all such modifications or changes can be considered to be included in the scope of the present invention.

| Explanation of the Numerals | |
|---|---|
| 10: PET bottle | 13: adhesive portion |
| 20: label | 21: adhesive portion |
| 21a: front end adhesive portion | 21b: rear end adhesive portion |
| 21c: non-adhesive portion | 22: cutting line |

What is claimed is:

1. A method of attaching a label to a PET bottle comprising the steps of:

attaching a front end adhesive portion 21*a* of a roll-type label made of synthetic resin film to a PET bottle;

rotating the PET bottle once so that a rear end adhesive portion 21*b* attaches to overlap the front end adhesive portion 21*a*; and cutting the label 20 at a cutting line 22 between the front end adhesive portion 21*a* and the rear end adhesive portion 21*b,* wherein a pressure sensitive adhesive is applied to the front end adhesive portion 21*a* and the rear end adhesive portion 21*b*.

2. The method according to claim 1, wherein a non-adhesive portion 21*c* without a pressure sensitive adhesive is formed at an upper portion of the rear end adhesive portion 21*b* to facilitate label removal.

3. The method of claim 2, wherein the synthetic resin film is a non-shrinkable film or a shrinkable film.

4. The method of claim 3, further comprising the step of heat-shrinking the attached label by attaching the label to the PET bottle and then heating it in a heating chamber when the synthetic resin film is a shrinkable film.

5. The method of claim 4, wherein the heat-shrinking step is performed within 1 second in a heating chamber at 70-80° C.

* * * * *